Dec. 16, 1930.  G. M. EKSTEDT  1,785,440
DEVICE TO BE USED IN TEACHING MUSIC
Filed Feb. 1, 1929  3 Sheets-Sheet 1
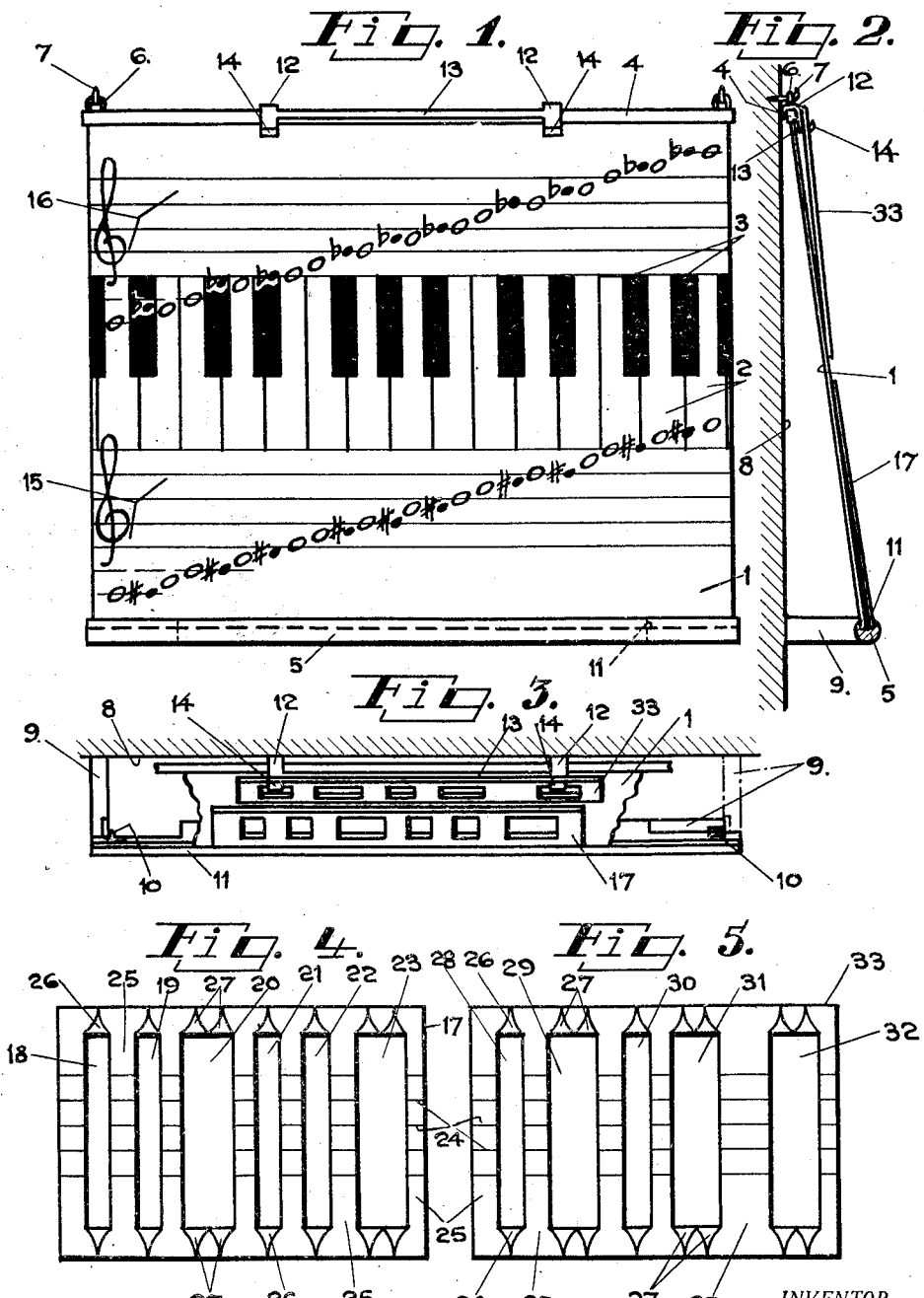
INVENTOR.
G. M. Ekstedt
BY Marks & Clerk
ATTORNEYS.

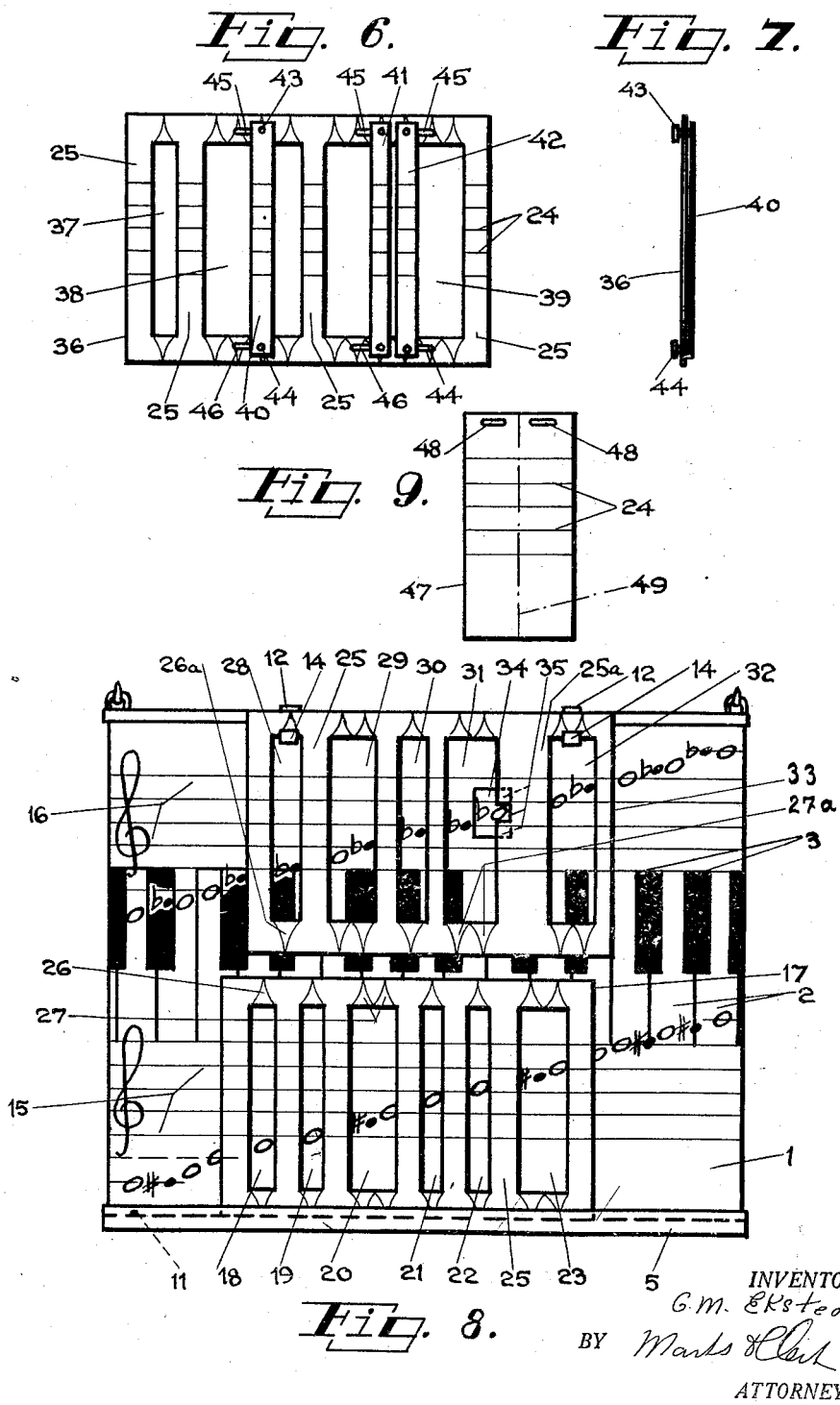

Dec. 16, 1930.   G. M. EKSTEDT   1,785,440
DEVICE TO BE USED IN TEACHING MUSIC
Filed Feb. 1, 1929   3 Sheets-Sheet 3
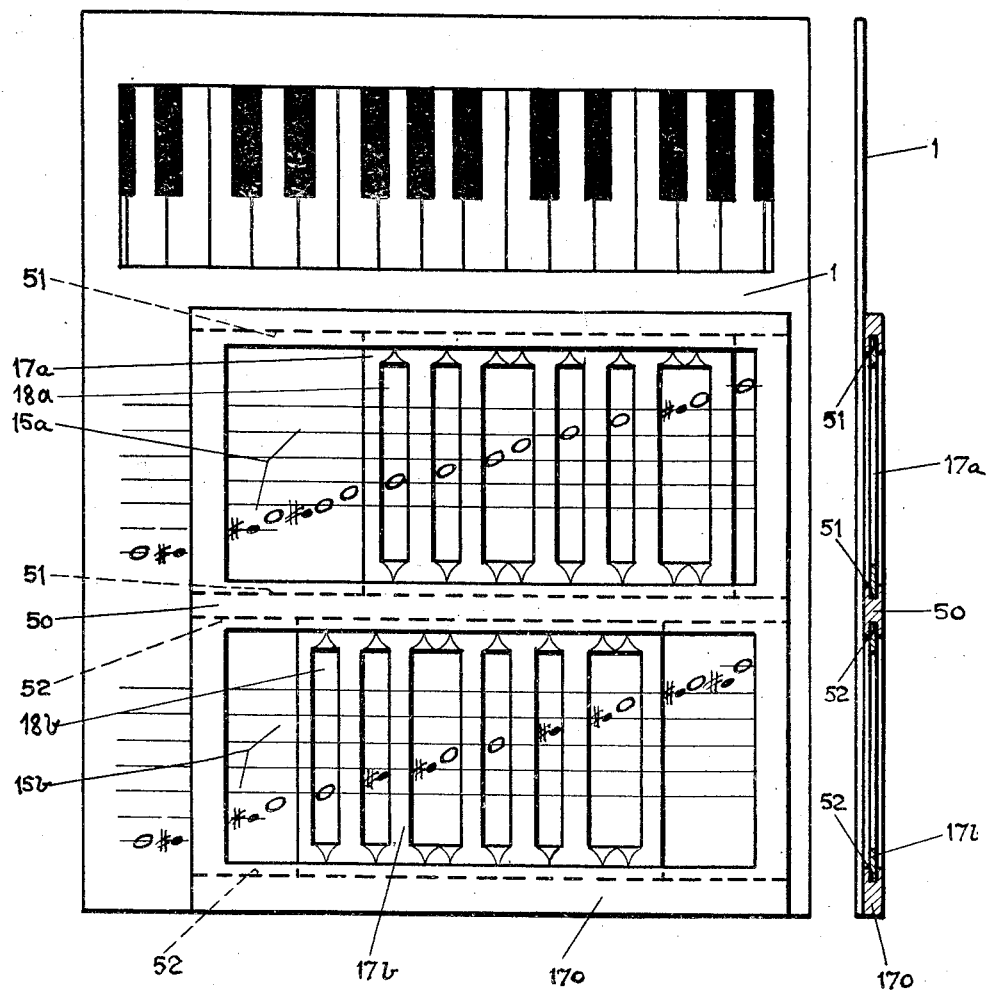
INVENTOR.
G. M. Ekstedt
BY Marks & Clark
ATTORNEYS.

Patented Dec. 16, 1930

1,785,440

UNITED STATES PATENT OFFICE

GUSTAF M. EKSTEDT, OF GOTTENBORG, SWEDEN

DEVICE TO BE USED IN TEACHING MUSIC

Application filed February 1, 1929, Serial No. 336,849, and in Sweden October 31, 1928.

This invention relates to the teaching of music and especially when a school class is to be given instruction in the primary elements of music. The same invention can be utilized for exercises in singing as well as in playing pianos and other instruments. It can as well be useful when transposing from one key to another or when reading notes in various clefs such as treble clef, bass clef, or tenor clef.

More particularly the invention is concerned with a chart or wall map showing the music signs of the chromatic scale or any other copy of music and provided with one or more movable members which are adapted to designate any selected number of specimens of the music symbols so that the attention of the observer will be directed especially to these signs and diverted from the other symbols.

According to a preferred embodiment of the invention the movable member is designed as a screen having the character of a cipher screen by means of which when laid upon the copy of music shown on a table, those signs only become visible which are to be read at the moment while those not required remain sheltered or covered by the same screen. In the especially preferred form of this invention the said cipher screen is designed so as to expose some scale such as the major or the minor or any other selected scale. Other features of this invention will be clearly understood from the following description and the annexed drawings in which similar parts are designated by the same figures of reference.

In the drawings:

Figure 1 shows an elevation of the table or map,

Figure 2 shows a cross section of the map suspended on a wall,

Figure 3 is a plan view of the table in position with some portions cut away,

Figure 4 shows a cipher screen for the major gamut,

Figure 5 is a similar view of a cipher screen for the harmonic minor gamut,

Figure 6 is a similar view of an adjustable cipher screen which can be utilized for the major mode as well as for the harmonic minor mode or for some other gamuts depending on the specific design of the individual screen, Figure 7 shows the adjustable screen in cross section, Figure 8 illustrates the map according to Figure 1 but with two screens provided, the one for a scale in a sharp key and the other for a scale in a flat key, Figure 9 shows a simple embodiment of the screen provided for a particular purpose, which will be described further below, Figures 10 and 11 show in elevation and cross section a modified form of device suitable for the reading of a score for an orchestra.

In all the figures the mechanical details of the parts as well as their configuration and the aspect of the signs and indications appearing on the tables are shown diagrammatically, whereby they have for their object merely to facilitate the understanding of the following description of the invention and not to be an exact illustration of the actual device.

Referring to the drawings in Figures 1 and 8, the table 1 is designed as a common wall map, preferably made of material similar to that used for such maps and provided with a stiffening rod 4 at the top edge and a similar rod 5 at the bottom edge. On the table 1 the image of a key board is shown with its white lower keys 2 and black upper keys 3. The top rod 4 is provided with rings or eyes 6 by means of which the table when used as a wall map, can be suspended upon a wall 8 on hooks 7. The bottom rod 5 at the ends is provided with collapsible prongs 9 pivoted on hinges 10 so that the prongs can be swung out perpendicularly to the rod 5 thus forming supports against the wall 8 which keep the lower portion of the map hanging in the hooks from off the wall so that the map forms an inclined plane as clearly shown in Figure 2. In order not to prevent the rolling of the map upon the rods 4 and 5 when idle the prongs 9 can be folded down onto the rod 5 as shown by broken lines in Figure 1. Along the upper side of the bottom rod 5 there is a slot 11, and upon the top rod 4 a rail 13 is slidably suspended by means of inverted hooks 12 said rail at its under side being provided with suspension hooks 14.

In conjunction with the picture of the key board 2, 3 the table 1 shows two staffs 15, 16 the first mentioned staffs below the picture of the key board and the other above said picture. Each of these staffs is provided with the complete symbols of a chromatic scale whereby the lower staff 15 shows the ascending sharp scale C, C♯, D, D♯ etc., and the upper staff 16 the flat scale C, D♭, D, etc. In both staffs 15, 16 the symbols are disposed exactly below or above respectively the image of the corresponding key 2 or 3 on the key board. In order to facilitate the understanding of the relation between the keys and the music symbols the natural notes are shown as open ovals i. e. "white" figures so as to correspond to the white lower keys 2, and the accidentals as closed ovals or black figures corresponding to the black keys 3.

If the teacher wishes to present before his pupils any desired musical indication as for instance a scale, a chord, an interval or such like, he can do so with this invention, by the use of a screen selected in accordance with the intended purpose. If for instance the teacher wants to show a major mode, he uses a screen of the character illustrated in Figure 4, and numbered 17 in Figure 8 where the screen is shown in operative position. This screen can be manufactured of paste-board, metal plate, thin wooden board or any other suitable material and will be applied upon the table 1 into the slot 11 in the bottom rod 5 if the major scale of a sharp key is to be illustrated. The inclined position of the table 1 caused by the distance pieces 9 as shown in Figure 2, has for its object to insure a steady position of the screen 17 when inserted with its bottom edge into the slot 11 of the rod 5 in which slot it can be slidden to the left or to the right along the staff 15 until it has reached its proper place where the required sharp scale can be observed.

In Figure 8 as an example the D major scale is shown by the screen 17 which mode has two sharps. To accomplish this the screen has six narrow windows 18, 19, 20, 21, 22, 23 (see Figure 4) which go laterally across it to such a length that they cover the entire height range of the staff 15 of music signs when the screen is disposed on the table in the slot 11 of rod 5. The width of the windows in the horizontal or length direction of the screen is such that only one sign is visible in each of the windows 18, 19, 21 and 22 while in each of the windows 20 and 23 two adjacent signs are visible. Preferably the screen is provided with staff lines 24 on the interspaces or "columns" 25 between the windows 18—23 in such a way, that, when the screen is at its proper place in the slot 11, the staff lines 24 on the screen register with the through going staff lines 15 on the table whereby the lines 27 make up for the portions of the note lines of the table which for the present are covered by the "columns" 25 of the screen, thus giving the effect of non-interrupted staff lines notwithstanding the presence of the screen.

It is also convenient to provide the screen with a finger 26 above each single window and two similar fingers 27 above each of the two double windows 20, 23 which fingers 26, 27 are numbered with the successive numbers 1 to 8 for the corresponding notes in the scale. These points 26, 27 indicates the keys 2 or 3 on the picture or plan of the key board corresponding to the notes visible in the windows.

If the image of the major scale of another sharp key is required the screen 17 is moved in the slot 11 until its window 18 shows the key note for the new scale. The other seven notes in the same scale then will be visible in the windows 19—23 respectively.

Figure 5 illustrates the cipher screen for a harmonic minor scale. This cipher screen has substantially the same appearance as the major scale screen just described with the only difference that the windows are designed somewhat otherwise such depending upon the character of the minor scale. In this screen only five windows are present, two of which, designated by 28 and 30, are single, i. e., they uncover each only one music symbol while the remaining three windows 29, 31 and 32 are double, and consequently they uncover each two music symbols. Also the "columns" between the windows are not all of an equal width as they are in the major scale screen where each "column" 25 has the same width as a single window. In the minor scale screen the "column" 25a between the two double windows 31 and 32 has the same width as each of said double windows while the width of the other "columns" 25 in the same screen is equal to the width of each single window.

The minor scale screen, of course, is to be utilized in exactly the same way as the aforesaid major scale screen, i. e., be placed in the slot 11 in the rod 5, and be moved therein to any required position along the staff lines 15 on the table 1 for the purpose of demonstrating any selected minor scale in a sharp key. The two screens, however, can each be used for the showing of any desired scale in flats in conjunction with the upper series 16 of note lines on table 1. In order to avoid repetition in the drawings it is suggested in Figure 8 that the minor scale screen, here designated with 33, will be used to illustrate a flat scale as for instance the E♭ minor scale. For that purpose the screen 33 will be suspended upon the rail 13 on the lower hooks 14 which are introduced through the windows 28 and 32 respectively. By means of the upper hooks 12 the rail 13 with the screen 33 can then be moved to the left or the right along the top rod 4 until the window 28 comes over the symbol for the key note in the E♭ minor scale.

Here, however, an error occurs. The E♭ minor scale has six flats and amongst those C♭ for B natural, but on account of the character of the chromatic scale and of the disposition and widths of the windows in the screen 33, the C♭ does not appear in the double window 31 adjacent the sign for B♭, but instead thereof B natural. To correct this error a correcting device must be used which is shown applied to the screen 33 in Figure 8. This correcting device comprises a rider 34 which occasionally can be attached to the screen in the window 31 at the right hand side thereof for instance by means of three projecting flaps 35 which grasp over the left hand edge of the column 25a with the intermediate flap 35 on the front side of the column 25a and the two outer flaps 35 on the rear side thereof. Said rider 34 carries the music sign C♭ which now covers the erroneous sign B of the table 1 so that the correct scale will appear in the windows. Such correction riders must be present for various demands provided each with its specific music sign and arranged so as to be attached to the screen on the right hand side of a window as well as on the left hand side thereof as the case may be, and on the major scale screen as well as on the minor scale screen. It does not affect the present invention how said correcting members are constructed provided that they are adapted to be attached to the scale screen at the place desired and bear the necessary indication to correct the one scale or the other. The rider 34 thus must be regarded as an arbitrarily chosen embodiment of the correcting member which may be varied in many respects.

To indicate the keys 2 or 3 in the picture or plan of the key board which correspond to the various notes shown in the screen 33, points or similar indices are provided below each of the windows therein whereby one point 26a appears below each of the single windows and two points 27a below each of the double windows. As the minor scale screen 33 must be capable of being used also in the slot 11 of the lower rod 5 just as the major scale screen similar points 26, 27 must be applied in the same way above each window also just as shown on the major scale screen 17, which last mentioned screen must be provided also with similar points 26a, 27a below each window to be used when the key 17 is utilized for a flat scale suspended in the rail 13.

There exists a plurality of other scales than the major and the minor scales, and the image of any of them can be brought before the observer by means of the same table 1, provided that the proper screen is selected, i. e. a screen with the windows disposed and proportioned in accordance with the mode desired. To avoid the cost and trouble of keeping a large number of screens of different appearances, use may be made of a single key the windows and "columns" of which are adjustable so that any wanted figure of notes can be illustrated by the mere sliding aside or removal of one or more "columns" in the screen. Figures 6 and 7 show as an example such an adjustable screen 36 which by simple manipulation can be adjusted to be either the screen for the major scale or the screen for the minor scale. The screen frame which in its outer appearance is practically identical with the screens 17 and 33 is provided with, starting from the left, first a single window 37, then a window 38 the width of which is four times that of a single window, and finally a window 39 six times as wide as a single window. The four stationary "columns" 25 are each of the same width as a single window, i. e. they will cover each only a single music symbol of the table 1, but the screen is provided further with three "columns" 40, 41, 42 which are adjustable in the length direction of the screen viz. one "column" 40 in the four fold window 38 and two "columns" 41 and 42 in the six fold window 39. The adusting of the "columns" 40, 41, 42 is brought about by pins 43, 44 which project from the two ends of the adjustable "columns" and pass through slots 45, 46 above, and below the two enlarged windows 38, 39. The adjustability of the "columns" 40, 41, 42 is such that they are able to alter the free openings in the windows 38, 39 so that either the windows 19—23 of the major scale screen 17 or the windows 29—32 of the minor scale screen 33 are simulated. Figure 6 shows this adjustable key arranged so as to be used for the minor gamut.

Of course, any arbitrary device for the adjusting of the "columns" can be used so that the pins 43, 44 and their slots 45, 46 are shown as an example only. For instance the adjustable "columns" 40, 41, 42 can be entirely free from the screen frame, and when wanted may be attached thereto in the proper positions by means of pins, buttons or the like without being slidable in the windows. Also any arbitrary distribution of the windows can be utilized, provided that the shape and number of the movable "columns" suit the requirements whereby any chosen mode or image of music symbols can be indicated.

Hitherto the description has referred to the exposing of certain scales or other figures of music symbols by the aid of a screen. The screen, however, can be designed as merely a cover which shelters a larger or smaller portion of the table 1. Figure 9 exemplifies such a simple screen 47 which comprises merely a sheet of the same thickness as the screens according to Figures 4–6 but of a shorter length. The screen 47 is provided with note lines 24 applied on such a distance above the lower edge of the screen that the lines 24 register with the note lines 15 on the table 1 when the screen 47 is disposed there-against in the slot 11 of the lower rod 5. Adjacent its top edge the screen 47 has two slots 48 by means of which the screen can be suspended upon the hooks 14 of the rail 13, said slots 48 are disposed at such a distance from the note lines 24 that said lines register with the note lines 16 on the table 1 when the screen 47 is suspended on the hooks 14 of the rail 13 suspended from the top rod 4 of the table 1. It is suggested that a shorter specimen of rail 13 will be used in conjunction with the screen 48 than was the case with the screens 17, 33 because then the hooks 14 will be brought nearer together so that both may be used to support the screen whereby a more stable position is obtained than if only one hook 14 were used.

The screen 47 will be utilized if the teacher requires that the pupil shall guess or by his mind restore the tones, the signs of which for the present are covered by the screen 47. For that purpose the screen 47 will be disposed on the table 1 such that an interruption occurs in the scale 15 or 16 on the table 1. If the screen 47 is made shorter or longer, the degree of interruption can be altered in length, and thus tests of memory and sense of pitch may be carried out. For that purpose either a plurality of mutually different screens 47 can be used or one and the same screen can be designed such that it can be given a larger or smaller length for instance by means of crease lines perpendicular to the note lines 24 as indicated by the dash line 49 in Figure 9 which crease lines facilitate the folding of the screen like a book cover. The height of the screen 47 preferably is so much less than that of the screens 17 or 33 that the points 26, 27 of those screens remain visible above the top edge of the screen 47, if it is applied on the table 1 in front of such a screen.

Especially when giving instructions in the primary elements of music to young pupils experience has shown it is very suitable to substitute the picture of the key board on the table 1 by a picture of for instance a landscape with valleys and mountains or hills whereby the landscape rises from the left to the right in correspondence to the pitch of the tones. The young pupils by such a picture receive a feeling based upon the sense of sight of the real ascending and descending of the tone as they imagine that they themselves move upwards to the right or downwards to the left.

Figures 10 and 11 illustrate in elevation and cross section a modification for assisting in the reading of the score for an orchestra. It frequently happens that some instruments of an orchestra must be transposed into another clef or key to better suit the character of said instrument. From that it follows that, if for instance the key for the note C is manipulated the note A will be sounded, or, generally speaking, that tone which corresponds to the transposing of the instrument. Such transposition will be easy to those who are familiar with the instrument, but those who can only play by direct reading of the score have to mentally rearrange the notes to be able to interpret the transposed tones. By the aid of this invention such an act of thinking may be extraordinarily facilitated if the embodiment shown in Figures 10 and 11 be utilized for chromatic scales in different clefs where each note is represented by its key (or actual pitch of tone).

In Figure 10 the table 1 comprises two systems of music symbols 15a, 15b both below the image of the key board, and provides the one system 15a for one instrument and the other system 15b for another instrument just as usual in a score for two instruments. Of course, any number of systems of music symbols can be used depending upon how many instruments there are in the orchestra, so that the two systems in Figure 10 are to be reckoned as a simple example only. To simplify the understanding both systems 15a, 15b are shown as including the chromatic scale whereby the symbols in the upper system 15a are disposed immediately above the corresponding symbols in the lower system 15b, just as in the usual scores. The keys 2 and 3 in the image of the key board are also disposed immediately above the corresponding music signs in the two systems 15a, 15b.

It is suggested that the instrument for which the upper note system 15a is provided, is transposed such that an E major scale in the lower note system 15b answers to a G major scale in the upper system 15a. To solve this problem a screen frame 170 is utilized which is laid on the chart or table 1 with its lower edge along the lower edge of the table 1. The height of the frame 170 is such that it covers both systems 15a, 15b, and the length of the frame is so much larger than the screen proper as is necessary to control the range of transposing which must be treated with this individual frame 170. In the drawing a few steps on the scale only can be controlled by the same frame. In the frame 170 there is a horizontal bar 50 which covers the free interspace between the two systems 15a, 15b. Further the frame 170 is provided with guides 51, 52 in which screens 17a, 17b of the same types as the major scale screen in Figure 4 can be slidably placed, the screen 17a in the space above the bar 50 and the key 17b in the space below said bar, each screen above one of the systems 15a, 15b. If now the instruments for both the systems of note were in "correct" tune, the two screens 17a, 17b must be disposed straight above each other when showing for instance the E-major gamut in the two systems. It was, however, suggested above that the instrument for the upper system 15a was transposed into G-major, hence the key 17a must be slid along its guides 51 so far to the right that the note G be visible in the window 18a, when the note E is visible in the window 18b of the key 17b for lower system 15b.

The invention is not limited to the specific design or mechanical arrangement of the frame 170 and its guides 51, 52 shown in Figures 10 and 11 but must be looked as covering any arbitrary form of these parts which fulfill the requirements mentioned above.

Having now particularly described and ascertained the nature of my said invention and in what manner the same is to be performed, I declare that what I claim is:—

1. A music teaching device comprising a chart with music staffs and a screen movable along the staffs to designate any desired group of music symbols, said chart including two staffs parallel to each other, one staff showing the chromatic sharp scale, and the other staff showing the flat scale and a plan of a key board arranged between the two staffs, the two staffs and the key board plan being arranged on a line directly above each other with the individual note symbol in the sharp scale in the same relative position as the same individual note symbol in the flat scale, the line passing over the representation in the key board plan which corresponds to the individual note symbol, said screen including a plate with windows therein so arranged in relation to the width of the keys in the key board plan as well as to the distance between the key board and each of the staffs, that in any selected disposition of the screen, each of its windows renders visible the required note symbol in the sharp scale or the flat scale, as the case may be, as well as the corresponding key in the key board plan whereby, in consideration of the configuration of the groups of notes for which the said screen is provided, either one single note symbol and the corresponding single key representation or two adjacent note symbols and the corresponding two adjacent key representations is visible in each individual window.

2. A device as claimed in claim 1, characterized in that each of the windows of the screen as well as the columns which separate the windows has the same width as that of one black key in the key board plan or of two such black keys where requisite, to illustrate a certain configuration of a group of notes whereby the configuration may be always defined clearly and free from mistake.

3. A device as claimed in claim 1, characterized in that one or more of the windows has a width that is a multiple of the width requisite to illustrate a certain configuration of a group of notes and in which one or more of the columns is movable so that the width of the corresponding window and its distance from the adjacent window may be varied whereby the same individual screen may be utilized for various configurations of groups of notes.

4. A device as claimed in claim 1, characterized by the provision of riders arranged to be temporarily attached to the screen on selected spaces within its windows whereby to conceal one or more of the note symbols in the chromatic scale which otherwise would be visible in said windows, the riders being provided with such note symbols which should be visible in said windows in order to define the special configuration of a group of note symbols desired.

5. A device as claimed in claim 1, characterized in that said screen is provided with supporting means at its lower edge and its upper edge whereby the same individual screen may be used in conjunction with either the upper staff or the lower staff.

6. A device as claimed in claim 1, characterized by the provision of a plurality of said screens provided with note lines having the same interspaces as the note lines of said staffs of the chart whereby the note lines on the screen are so disposed as to register with the note lines of that staff of the chart in connection with which the screen is to be used whereby the note lines of the screen may be used as a substitute for those portions of the note lines of the chart staffs which are temporarily concealed by the screen.

In testimony whereof I have affixed my signature.

GUSTAF M. EKSTEDT.